US007130758B2

(12) United States Patent
Srivastava et al.

(10) Patent No.: US 7,130,758 B2
(45) Date of Patent: Oct. 31, 2006

(54) METHOD FOR ANALYTICALLY OBTAINING CLOSED FORM EXPRESSIONS FOR SUBSURFACE TEMPERATURE DEPT DISTRIBUTION ALONG WITH ITS ERROR BOUNDS

(75) Inventors: Kirti Srivastava, Andhra Pradesh (IN); Rohit Sharma, Andhra Pradesh (IN); Bushra Fatima, Andhra (IN); R. N. Singh, Andhra Pradesh (IN)

(73) Assignee: Council of Scientific and Industrial Research, New Delhi (IN)

(*) Notice: Subject to any disclaimer, the term of this patent is extended or adjusted under 35 U.S.C. 154(b) by 0 days.

(21) Appl. No.: 10/813,437

(22) Filed: Mar. 31, 2004

(65) Prior Publication Data
US 2004/0220740 A1 Nov. 4, 2004

Related U.S. Application Data

(60) Provisional application No. 60/458,447, filed on Mar. 31, 2003.

(51) Int. Cl.
*G01K 17/00* (2006.01)
(52) U.S. Cl. .............................. 702/136; 702/130
(58) Field of Classification Search ............... 702/130, 702/136; 374/136, 137
See application file for complete search history.

(56) References Cited

U.S. PATENT DOCUMENTS

2004/0243311 A1* 12/2004 Srivastava et al. ............ 702/12

OTHER PUBLICATIONS

Srivastava et al., "A Stochastic model to quantify the steady-state crustal geotherms subject to uncertainties in thermal conductivity", Sep. 1999, Geophysical Journal International, vol. 138 Issue 3, p. 895-899.*

* cited by examiner

*Primary Examiner*—Michael Nghiem
*Assistant Examiner*—Stephen J. Cherry
(74) *Attorney, Agent, or Firm*—Nixon & Vanderhye P.C.

(57) ABSTRACT

Analytical solutions to error bounds on the temperature depth distribution have been given in this invention. Solving the one dimensional steady state heat conduction equation for different sets of boundary conditions and radiogenic heat generation and incorporating Gaussian randomness in the thermal conductivity analytical closed form solutions to the mean and variance in the temperature depth distribution have been obtained. These closed form analytical solutions of mean and variance for the temperature field for different conditions have been used to compute and display the plot and results of the temperature depth profiles along with its error bounds. Quantifying the error statistics in the system output due to errors in the system input is very essential for a better evaluation of the system behavior. Earth Scientists involved in understanding the subsurface thermal structure relevant to geodynamical studies will benefit using these findings.

7 Claims, 7 Drawing Sheets

Fig. 3

Figure 1:
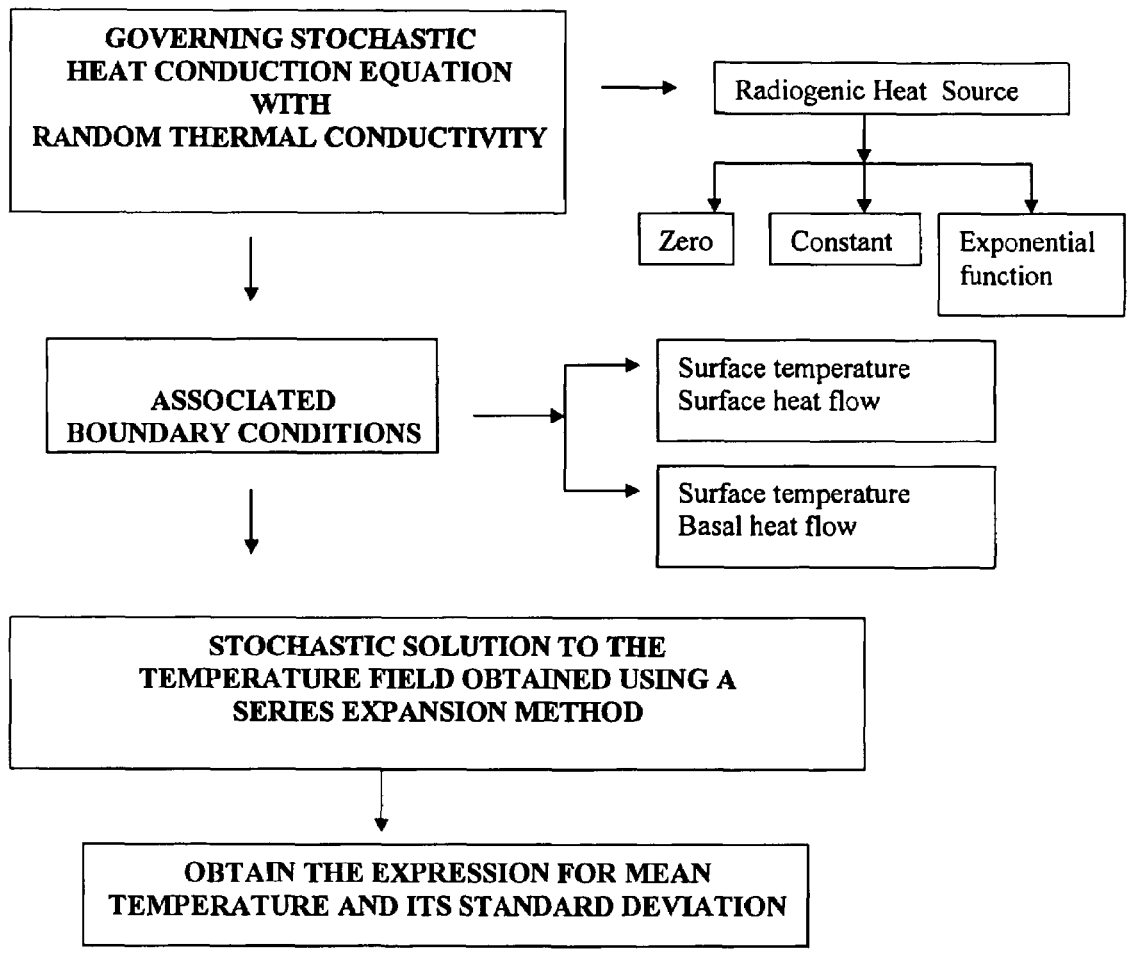

Subsurface Temperature and it's error bounds-CONDITION 2

To get the subsurface temperature depth distribution with its error bounds enter the values of the controlling parameters in the text boxes and hit SET T0 [0]   QB [30] Basal Heat Flow   L [5.5]   K [2]   CK [.3]   Row [1]   Set L= Lower Bound U= Upper Bound

GEOTHERM

| Zd | t[i] | tub[i] | tlb[i] | sd[i] |
|---|---|---|---|---|
| 3.0 | 45.0 | 59.0 | 31.0 | 14.0 |
| 3.5 | 52.0 | 71.0 | 33.0 | 19.0 |
| 4.0 | 60.0 | 84.0 | 36.0 | 24.0 |
| 4.5 | 67.0 | 96.0 | 38.0 | 29.0 |
| 5.0 | 75.0 | 109.0 | 41.0 | 34.0 |
| 5.5 | 82.0 | 122.0 | 42.0 | 40.0 |

METHOD FOR ANALYTICALLY OBTAINING CLOSED FORM EXPRESSIONS FOR SUBSURFACE TEMPERATURE DEPT DISTRIBUTION ALONG WITH ITS ERROR BOUNDS

This application hereby claims and is entitled to the benefit of provisional application Ser. No. 60/458,447, filed Mar. 31, 2003.

FIELD OF THE INVENTION

The present invention relates to analytical solution to error bounds on the subsurface temperature depth distribution. This invention has a wide range of application in quantifying the subsurface thermal state of the crust and has a wide range of applications. The method of the invention has helped in obtaining closed form expressions for the subsurface temperature depth distribution along with its error bounds. The exact formulae are useful in better evaluating the thermal state and have a wide range of applications in oil and natural gas prospecting, tectonic studies and mineral prospecting.

BACKGROUND OF THE INVENTION

This invention relates for obtaining and computing the subsurface temperature depth distribution along with its error bounds. The solution has been determined for the stochastic heat conduction equation by considering different sets of boundary conditions and radiogenic heat sources and incorporating randomness in the thermal conductivity. In understanding the Earth thermal structure there are several questions which need clear answers. Many of the controlling parameters that define the Earth's processes are not known with certainty. In such situations these controlling parameters can be defined in a stochastic framework and an average picture of the system behavior together with its error bounds can be quantified.

The thermal structure of the Earth's crust is influenced by its geothermal parameters such as thermal conductivity, radiogenic heat sources and initial and boundary conditions. Basically two approaches of modeling are commonly used for the estimation of the subsurface temperature field. These are: (1) deterministic approach and (2) the stochastic approach. In the deterministic approach the subsurface temperature field is obtained assuming that the controlling thermal parameters are known with certainty. However, due to inhomogeneous nature of the Earth's interior some amount of uncertainty in the estimation of the geothermal parameters are bound to exist. Uncertainties in these parameters may arise from the inaccuracy of measurements or lack of information about the parameters themselves. Such uncertainties in parameters are incorporated in the stochastic approach and an average picture of the thermal field along with its associated error bounds are determined. To assess the properties of the system at a glance we need to obtain the mean value that gives the average picture and the variance or the standard deviation that is the variability indicator which gives the errors associated with the system behavior due to errors in the system input.

Subsurface temperatures are also seen to be very sensitive to perturbations in the input thermal parameters and hence several studies have been carried out in quantifying the perturbations in the temperatures and heat flow using stochastic analytical and random simulation techniques. Quantification of uncertainty in the heat flow using a least squares inversion technique incorporating uncertainties in the temperature and thermal conductivities has been done, Tectonophysics, Vol 121, 1985 by Vausser et al. The effect of variation in heat source on the surface heat flow has also been studied, Journal Geophysical Research, V 91, 1986, by Vasseur and Singh, Geophysical Research Letters, V14, 1987, by Nielsen. In most of the studies the stochastic heat equation has been solved using the small perturbation method. Using the small perturbation method the heat conduction equation has been solved by incorporating uncertainties in the heat sources and the mean temperature field along with its error bounds have been obtained, Geophysical Journal International, 135, 1998, by Srivastava and Singh. The random simulation method has also been used to model the thermal structure incorporating uncertainties in the controlling thermal parameters, Tectonophysics, V156, 1988 by Royer and Danis, Marine and Petroleum Geology, V 14, 1997, by Gallagher et al, Tectonophysics, V 306, 1999a, b, by Jokinen and Kukkonen. This numerical modeling is very useful in studying the nonlinear problems but sometimes simple 1-D analytical solution to the mean behavior and its associated error bounds is very useful in quantifying the uncertainty. The stochastic differential equations in other fields are now being solved by yet another approach called the decomposition method, Journal of Hydrology, V 169, 1995, by Serrano. In a recent study using this new approach the stochastic heat equation has been solved incorporating uncertainties in the thermal conductivity where the solution to the temperature field is obtained using a series expansion method, Geophysical Journal International, V 138, 1999, by Srivastava and Singh. The thermal conductivity is considered to be a random parameter with a known Gaussian colored noise correlation structure.

In this invention the stochastic solution to the mean and variance in the temperature field for a different set of boundary conditions and different radiogenic heat source function has been obtained following the procedure of Geophysical Journal International, V 138, 1999, by Srivastava and Singh. The expressions for mean and variance in temperature depth distribution for different heat sources and boundary conditions have been obtained and used to compute and plot the subsurface thermal field along with its error bounds.

OBJECTS OF THE INVENTION

The main object of the invention is to provide analytical solution to error bounds on the subsurface temperature depth distribution which obviates the drawbacks detailed above Another object of the invention is to provide an efficient method for obtaining closed for solution to error bounds on temperature depth distribution for different set of boundary conditions.

Yet another object of the invention is to provide for quantification of subsurface temperature depth distribution and its error bounds for known Gaussian thermal conductivity structure.

BRIEF DESCRIPTIONS OF THE DRAWINGS

The attached figures (FIGS. 2–7) are the plots of mean temperature ±1 standard deviation for different values of the controlling thermal parameters.

FIG. 1 is a flow sheet depicting the method of the invention.

Figure 2:
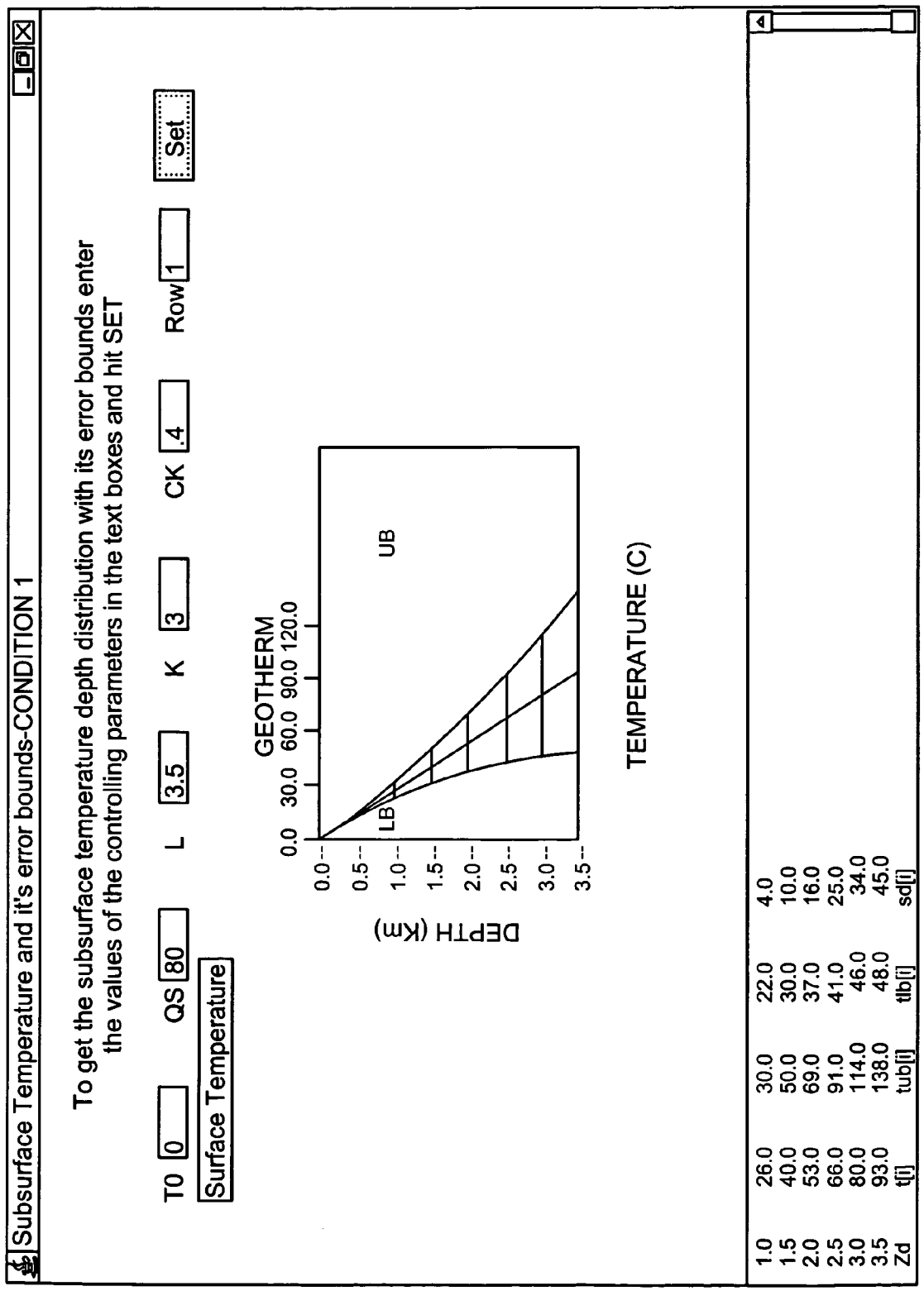

FIG. 2 is a computer input/output screen graphical representation of the subsurface temperature obtained at various depths when surface temperature is constant and there is a constant surface heat flow and when there is no heat source. As depicted, for example, input boundary conditions are set such that the surface temperature, T0=0° C.; surface heat flow, QS=80 mW/m², K=3 is the thermal conductivity of the surface; and CK=0.4 is the coefficient of variability in the thermal conductivity. Then, as also shown, at a depth of 2 KM from the surface the determined mean temperature (t) is 53.0° C., upper bound temperature (tub) is 69.0° C. and lower bound temperature is 37.0° C. The standard deviation is 16.0.

FIG. 3 is a computer input/output screen graphical representation of the subsurface temperature obtained at various depths when surface temperature is zero and there is a constant basal heat flow and when there is no heat source. For example, as shown, input boundary conditions are set so that surface temperature, T0=0° C.; basal heat flow, QB is 30 mW/m², K is the thermal conductivity of the surface; and CK is the coefficient of variability in the thermal conductivity. Then, as shown, at a depth of 3 KM from the surface the mean temperature (t) is 45.0° C., upper bound temperature (tub) is 59.0° C. and lower bound temperature is 31.0° C. The standard deviation is 14.0.

Figure 4:
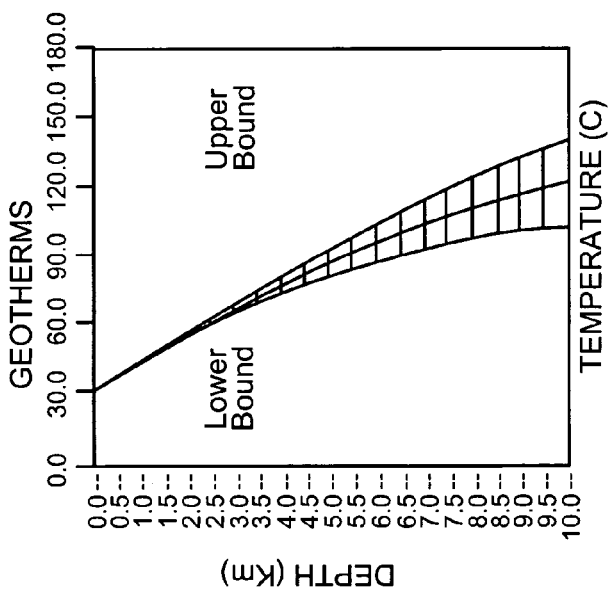

FIG. 4 is a computer input/output screen graphical representation of the subsurface temperature obtained at various depths when surface temperature is constant and there is a constant surface heat flow and in the presence of a constant heat source. For example, as shown, input boundary conditions are set so that surface temperature, T0=30° C.; surface heat flow, QS is 40 mW/m², K is the thermal conductivity of the surface; CK is the coefficient of variability in the thermal conductivity and A is the radiogenic heat source kept at 2.5 μW/m³. Then, as shown, at a depth of 7.5 KM from the surface the mean temperature (t) is 106.0° C., upper bound temperature (tub) is 118.0° C. and lower bound temperature is 94.0° C. The standard deviation is 12.0.

Figure 5:
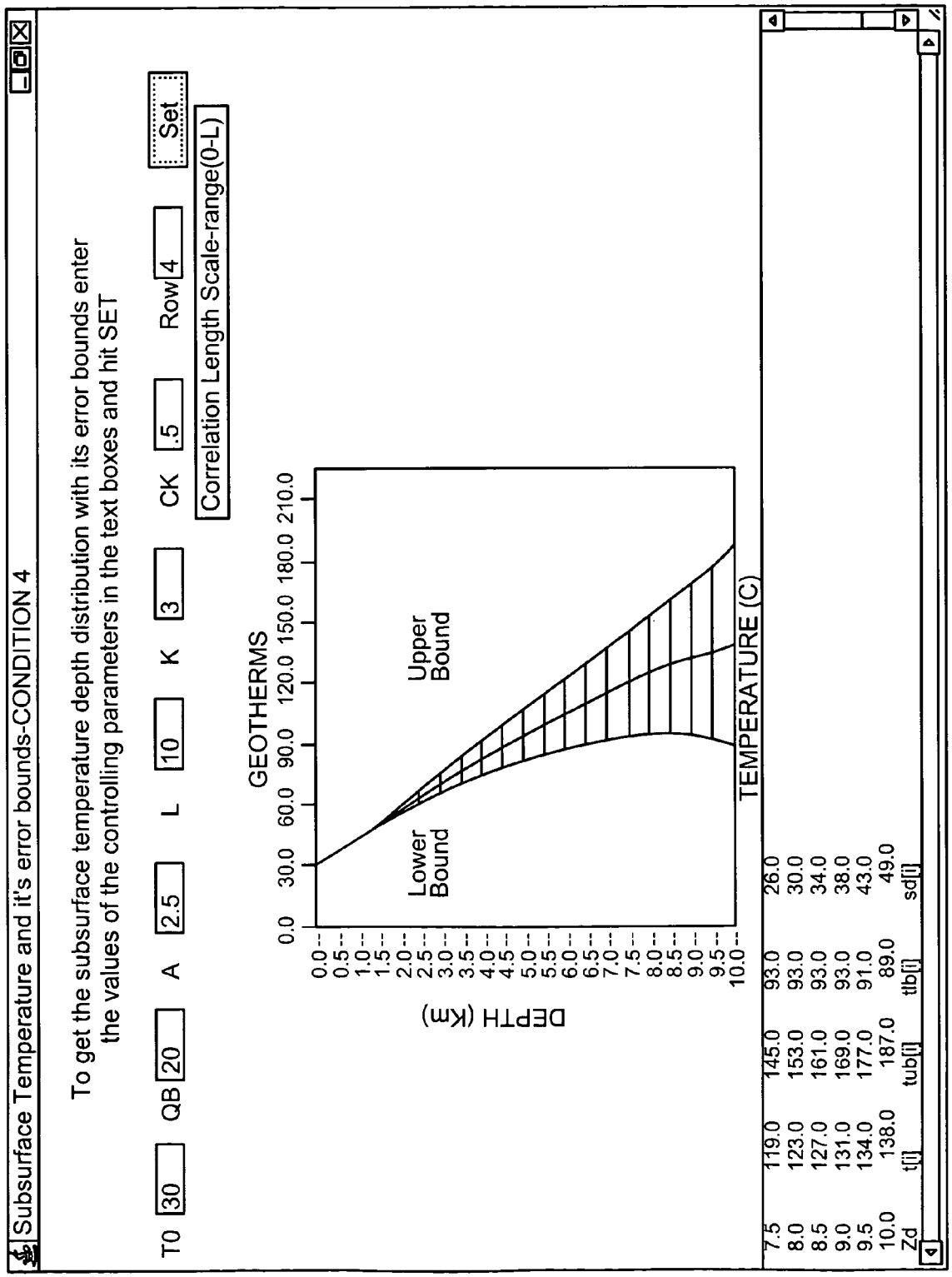

FIG. 5 is a computer input/output screen graphical representation of the subsurface temperature obtained at various depths when surface temperature is constant and there is a constant basal heat flow and in the presence of constant heat source. For example, as shown, input boundary conditions are set so that surface temperature, T0=30° C.; basal heat flow, QB is 20 mW/m², K is the thermal conductivity of the surface; CK is the coefficient of variability in the thermal conductivity and A is the radiogenic heat source kept at 2.5 μW/m³. Then, as shown at a depth of 7.5 KM from the surface the mean temperature (t) is 119.0° C., upper bound temperature (tub) is 145.0° C. and lower bound temperature is 93.0° C. The standard deviation is 26.0.

Figure 6:
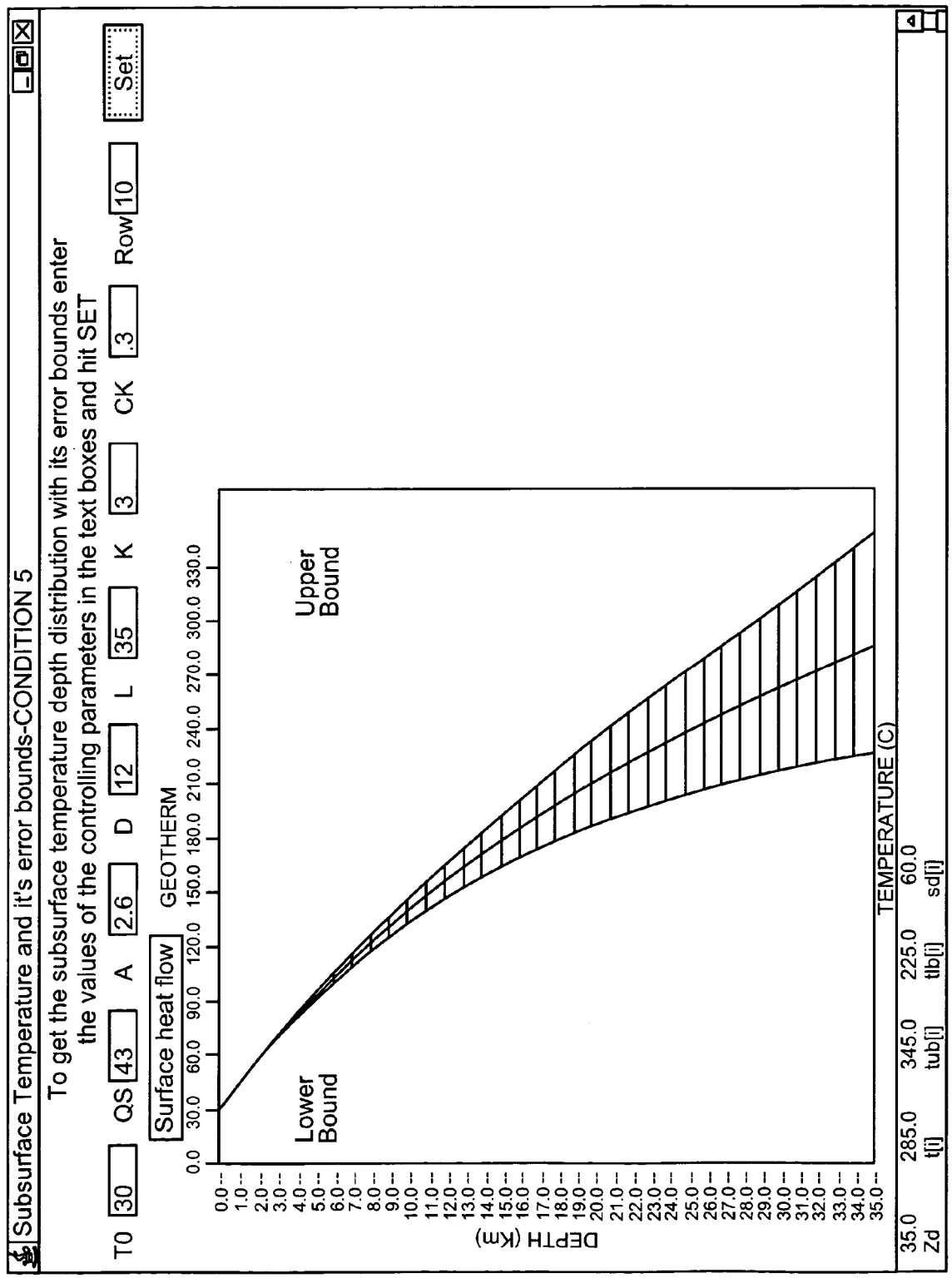

FIG. 6 is a computer input/output screen graphical representation of the subsurface temperature obtained at various depths when surface temperature is constant and there is a constant surface heat flow and when an exponential heat source is considered. For example, as shown, input boundary conditions are set so that surface temperature, T0=30° C.; surface heat flow, QS is 43 mW/m², K is the thermal conductivity of the surface; CK is the coefficient of variability in the thermal conductivity and A is the radiogenic heat source kept at 2.6 μW/m³. Then, as shown, at a depth of 35.0 KM from the surface the mean temperature (t) is 285.0° C., upper bound temperature (tub) is 345.0° C. and lower bound temperature is 225.0° C. The standard deviation is 60.0.

Figure 7:
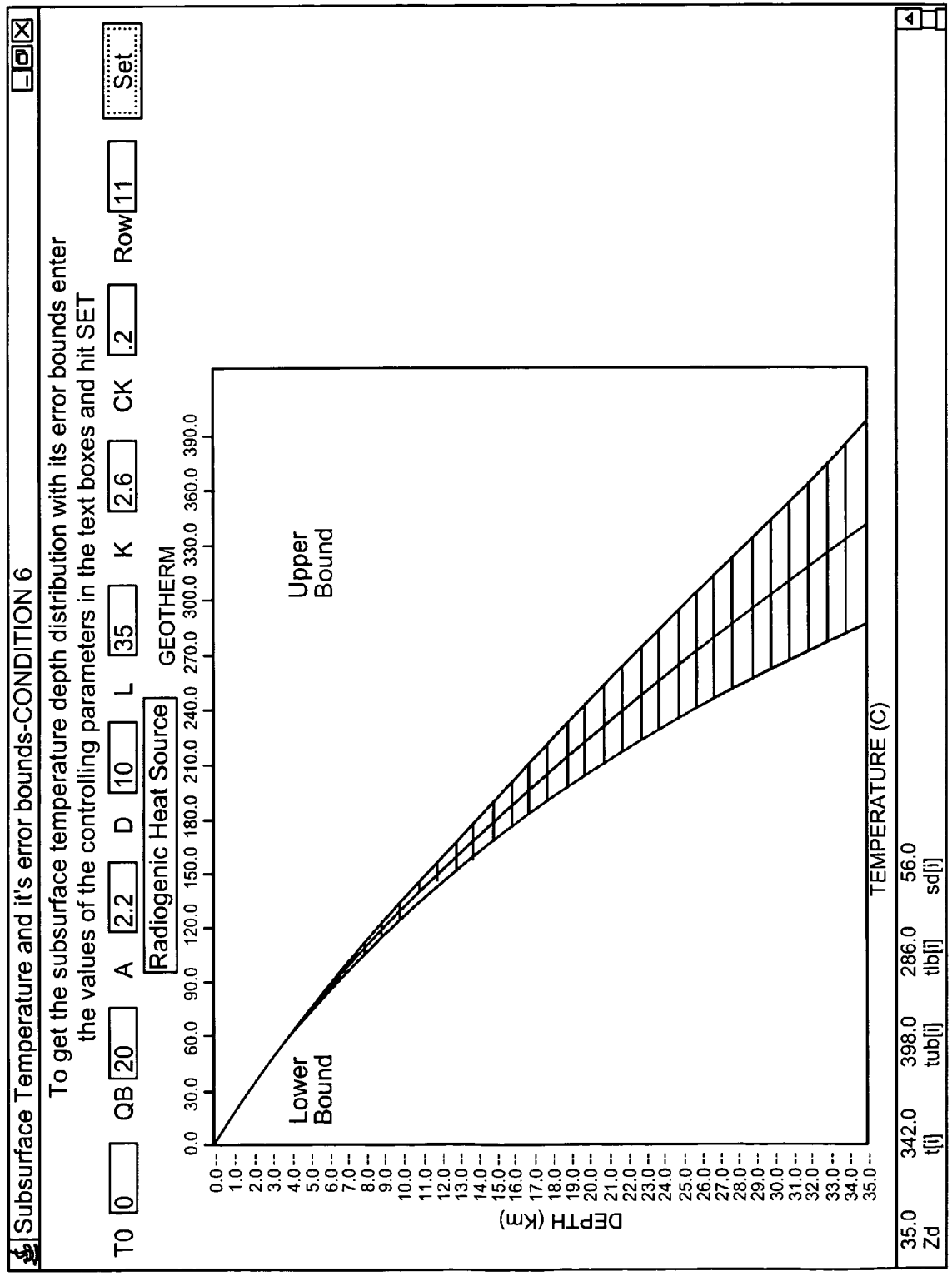

FIG. 7 is a computer input/output screen graphical representation of the subsurface temperature obtained at various depths when surface temperature is constant and there is a constant basal heat flow and when an exponential heat source is considered. For example, as shown, input boundary conditions are set so that the surface temperature, T0=0° C.; basal heat flow, QB is 20 mW/m², K is the thermal conductivity of the surface; CK is the coefficient of variability in the thermal conductivity and A is the radiogenic heat source kept at 2.2 μW/m³. Then, as shown at a depth of 35 KM from the surface the mean temperature (t) is 342.0° C., upper bound temperature (tub) is 398.0° C. and lower bound temperature is 286.0° C. The standard deviation is 56.0.

SUMMARY OF THE INVENTION

Accordingly the invention provides an analytical solution to error bounds on the subsurface temperature depth distribution, which comprises a method of solving the heat conduction equation incorporating Gaussian uncertainties in the thermal conductivity.

In an embodiment of the present invention the stochastic heat conduction equation has been solved using a series expansion method to obtain the closed form solution to the mean and variance in the temperature depth distribution. Simple deterministic solution to the problem is not sufficient and quantifying the errors in the system output due to errors in the input parameters is very essential. These errors bounds are very important for a better evaluation of the subsurface thermal structure.

In another embodiment of the present invention the expression for mean temperature and the variance in temperature are obtained for six different set of prescribed boundary conditions.

DETAILED DESCRIPTION OF THE INVENTION

The present invention deals with the solution to the governing stochastic heat conduction equation to obtain the mean and variance in the temperature fields as shown in the flow chart. The heat conduction equation with random thermal conductivity is expressed as $$\frac{d}{dz}\left\{(\overline{K} + K'(z))\frac{dT}{dz}\right\} = -A(z) \tag{1}$$

where
T is the temperature (° C.),
A(z) is the radiogenic heat source (μW/m³),
K(z)=$\overline{K}$+K'(z) is the thermal conductivity (W/m° C.) which is expressed as a sum of a deterministic component and a random component K'(z) is the random component with mean zero and a Gaussian colored noise correlation structure represented by $$E(K'(z))=0 \tag{2}$$

$$E(K'(z_1)K'(z_2))=\sigma_K^2 e^{-\rho|z_1-z_2|} \tag{3}$$

where
$\sigma_K^2$ is the variance in thermal conductivity (W/m° C.)²
$\rho$ is the correlation decay parameter m⁻¹ (or 1/$\rho$ is the correlation length scale)
$z_1$ and $z_2$ are the depths (m).

Following the procedure of given in Geophysical J International, V 138, 1999 by Srivastava and Singh, the solution to mean temperature and its standard deviation has been obtained for three conditions of heat sources (1) Zero (A(z)=0) (2) Constant (A(z)=A) and (3) Exponentially decreasing with depth (A(z)=A$_0$e$^{-z/D}$) and Associated boundary conditions are defined by Type(i) Boundary Condition:

Constant Surface Temperature $$T=T_0 \text{ at } z=0 \quad (4)$$

Surface heat flow Q$_s$ (mW/m$^2$)

$$\overline{K}\frac{dT}{dz} = Q_s \text{ at } z = 0 \quad (5)$$

Type (ii) Boundary Condition:

Constant Surface Temperature $$T=T_0 \text{ at } z=0 \quad (6)$$

Basal heat flow Q$_B$ (mW/m$^2$)

$$\overline{K}\frac{dT}{dz} = Q_B \text{ at } z = L \quad (7)$$

The standard deviation, which is a measure of error in the system output, is obtained by taking the square root of the variance. The solutions to different conditions obtained have been given below.

Condition 1: When no heat source is considered and the B.C used are the surface temperature and surface heat flow The governing heat conduction equation without heat source term is $$\frac{d}{dz}\left\{(\overline{K} + K'(z))\frac{dT}{dz}\right\} = 0 \quad (8)$$

with constant surface temperature and constant surface heat flow as boundary conditions (Type (i))

Solution

Mean Temperature $$\overline{T} = E(T(z)) = T_0 + \frac{Q_s}{\overline{K}}z \quad (9)$$

Variance in Temperature $$\sigma_T^2 = c1 \times \text{Term1} \quad (10)$$

where $$c1 = 2C_K^2 Q_s^2/\overline{K}^2$$

and $$\text{Term1} = \rho\frac{z^3}{3} - \frac{z^2}{2} + \frac{1}{\rho^2}(1 - e^{-\rho z}) - \frac{z}{\rho}e^{-\rho z}$$

where $C_K = \sigma_K/\overline{K}$ is the coefficient of variability in the thermal conductivity.

Condition 2: When no heat source is considered and the B.C used are surface temperature and heat flow at the base of the model (Q$_s$=Q$_B$)

The governing heat conduction equation without heat source term is $$\frac{d}{dz}\left\{(\overline{K} + K'(z))\frac{dT}{dz}\right\} = 0 \quad (11)$$

with constant surface temperature and constant basal heat flow as boundary conditions (Type (ii))

Solution

Mean Temperature $$\overline{T} = E(T(z)) = T_0 + \frac{Q_B}{\overline{K}}z \quad (12)$$

Variance in Temperature $$\sigma_T^2 = c1 \times \text{Term1} \quad (13)$$

where $$c1 = 2C_K^2 Q_B^2/\overline{K}^2$$

and

Term 1 is same as given in condition1.

Condition 3: When constant heat source is considered and the B.C used are the surface temperature and surface heat flow The governing heat conduction equation with constant heat source term is $$\frac{d}{dz}\left\{(\overline{K} + K'(z))\frac{dT}{dz}\right\} = -A \quad (14)$$

with constant surface temperature and constant surface heat flow as boundary conditions (Type (i))

Solution

Mean Temperature $$\overline{T} = E(T(z)) = T_0 + \frac{Q_s}{\overline{K}}z - \frac{Az^2}{2\overline{K}} \quad (15)$$

Variance in Temperature $$\sigma_T^2 = c1 \times \text{Term1} + c2 \times \text{Term2} + c3 \times \text{Term3} + c4 \times \text{Term4} \quad (16)$$

where $$c1 = C_K^2(A-\rho Q_s)^2/\overline{K}^2$$

$$c2 = C_K^2 A\rho(A-\rho Q_s)/\overline{K}^2$$

$$c3 = c2$$

$$c4 = C_K^2 \rho^2 A^2/\overline{K}^2$$

and $$Term1 = \frac{1}{\rho^2}\left(\rho\frac{2z^3}{3} + \frac{e^{-\rho z}}{\rho^2}(-\rho z - 1 + e^{\rho z}) - \frac{(\rho z + 1)}{\rho^2}(\rho z + e^{-\rho z} - 1)\right)$$

$$Term2 = \frac{(\rho z + 2)}{\rho^3}\left(((\rho z + e^{-\rho z} - 1)/\rho^2) + \rho\frac{z^3}{2} + \right.$$

$$\left(\frac{z^2}{2} - \frac{\rho z^3}{3} - z^2\right)\frac{z^4}{12\rho} + \frac{(\rho^2 z - 2\rho)}{\rho^3}\frac{z^3}{6}\frac{z^4}{12\rho} +$$

$$\left.\frac{(\rho z - 2)z^2}{2\rho^3} - \frac{(\rho z + 2)}{\rho^5}(-(\rho z + 1)e^{-\rho z} + 1)\right)$$

$$Term3 = \frac{1}{\rho^2}\left(\frac{\rho z^4}{6} + \frac{(\rho z + 1)}{\rho^2}((\rho z + 1)e^{-\rho z} - 1)\frac{(\rho z - 2)}{\rho}\right) - \rho z^2 e^{-\rho z}\right) +$$

$$\frac{(\rho z - 1 + e^{-\rho z})}{\rho^2}\left(\left(z + \frac{2}{\rho}\right) - \frac{z^2}{\rho}\right)$$

$$Term4 = \frac{(z + 2/\rho)}{\rho^2}\left(\frac{\rho z^4}{12} - \frac{z^3}{6} + (z^2 e^{-\rho z})/\rho + \right.$$

$$\left((-(\rho z + 1)e^{-\rho z} + 1)\frac{(z - 2/\rho)}{\rho^2}\right) - \frac{z^5}{20\rho} +$$

$$\frac{(z + 2/\rho)}{\rho^2}(-(\rho z - 1) + e^{-\rho z})\frac{(z\rho + 1)z}{\rho^2} +$$

$$(\rho z + 1)e^{-\rho z}\left(\frac{z^2 e^{\rho z}}{\rho} - \frac{2}{\rho^3}((\rho z - 1)e^{\rho z} + 1)\right) +$$

$$\left.\frac{\rho z^4}{12} + \frac{z^3}{6} + \frac{(z + 2/\rho)}{\rho^3}((\rho z - 1)e^{\rho z} + 1)z^2 e^{-\rho z} - \frac{z^5}{20\rho} - \frac{z4}{\rho^2}\right.$$

Condition 4: When constant heat source is considered and the B.C used are the surface temperature and heat flow at the base of the model The governing heat conduction equation with constant heat source term is $$\frac{d}{dz}\left\{(\overline{K} + K'(z))\frac{dT}{dz}\right\} = -A \quad (17)$$

with constant surface temperature and constant basal heat flow as boundary conditions (Type (ii))

Solution

Mean Temperature $$\overline{T} = E(T(z)) = T_0 + \frac{(Q_B + A*L)}{K}z - \frac{Az^2}{2K} \quad (18)$$

Variance in Temperature $$\sigma_T^2 = c1 \times Term1 + c2 \times Term2 + c3 \times Term3 + c4 \times Term4 \quad (19)$$

where $c1 = C_K^2(A - \rho(Q_B + A*L))^2/\overline{K}^2$ $c2 = C_K^2 A\rho(A - \rho(Q_B + A*L))/\overline{K}^2$ $c3 = c2$ $c4 = C_K^2 \rho^2 A^2/\overline{K}^2$ Term1, Term2, Term3 and Term4 are same as given in condition3.

Condition 5: When an exponential heat source function is considered and the B.C used are the surface temperature and surface heat flow The governing heat conduction equation with an exponential heat source term $$\frac{d}{dz}\left\{(\overline{K} + K'(z))\frac{dT}{dz}\right\} = -A_0 e^{-z/D} \quad (20)$$

with constant surface temperature and constant surface heat flow as boundary conditions (Type (i))

Solution

Mean Temperature $$\overline{T} = E(T(z)) = T_0 + \frac{Q_s}{K}z + \frac{A_0 D^2}{K}\left(1 - \frac{z}{D} - e^{-z/D}\right) \quad (21)$$

Variance in the Temperature $$\sigma_T^2 = c1 \times Term1 + c2 \times Term2 + c3 \times Term3 + c4 \times Term4 \quad (22)$$

where the constants are $c1 = C_K^2 A_0^2 (1 - \rho D)^2/\overline{K}^2$ $c2 = C_K^2 A_0 \rho(\rho D - 1)(Q_s - A_0 D)/\overline{K}^2$ $c3 = c2$ $c4 = C_K^2 \rho^2 (Q_s - A_0 D)^2/\overline{K}^2$ The closed form solution for the integrals the in the above equation are $$Term1 = \frac{1}{4(\rho - 1/D)^2}\{(\rho D - 1)(2z^2 - 2zD - D^2 e^{-2z/D} + D^2) +$$

$$\frac{4[z(\rho - 1/D) + 1]}{(\rho + 1/D)^2}[-z(\rho + 1/D) - e^{-z(\rho + 1/D)} + 1] +$$

$$[2zD + D^2 e^{-2z/D} - D^2]\} +$$

$$\frac{1}{4(\rho + 1/D)^2}\{(\rho D + 1)(2z^2 - 2zD - D^2 e^{-2z/D} + D^2) +$$

$$\frac{4}{(\rho - 1/D)^2}[-z(\rho - 1/D)e^{-z(\rho + 1/D)} + e^{-2z/D} - e^{-z(\rho + 1/D)}] -$$

$$[2zD + D^2 e^{-2z/D} - D^2]\}$$

$$Term2 = \frac{1}{\rho^2}\{2\rho(z^2 D - 2zD^2 - 2D^3 e^{-z/D} + 2D^3) -$$

$$\frac{(1 + \rho z)}{(\rho + 1/D)^2}[z(\rho + 1/D) + e^{-z(\rho + 1/D)} - 1] +$$

$$\frac{e^{-\rho z}}{(\rho - 1/D)^2}[-z(\rho - 1/D) + e^{z(\rho - 1/D)} - 1]\}$$

$$Term3 = \frac{1}{(\rho - 1/D)^2}\{(\rho - 1/D)(z^2 D - 2zD^2 - 2D^3 e^{-z/D} + 2D^3) -$$

-continued $$\frac{z(\rho-1/D)+1}{\rho^2}[\rho z+e^{-\rho z}-1]+$$

$$[zD+D^2e^{-z/D}-D^2]\}+$$

$$\frac{1}{(\rho+1/D)^2}\{(\rho+1/D)(z^2D-2zD^2-2D^3e^{-z/D}+2D^3)+$$

$$\frac{e^{-z(\rho+1/D)}}{\rho^2}[-\rho z+e^{\rho z}-1-$$

$$[zD+D^2e^{-z/D}-D^2]\}$$

$$Term4=\frac{1}{\rho^2}\{\frac{2}{3}\rho z^3-\frac{(\rho z+1)}{\rho^2}(\rho z+e^{-\rho z}-1)+\frac{e^{-\rho z}}{\rho^2}[-\rho z+e^{\rho z}-1]\}$$

Condition 6: When an exponential heat source function is considered and the B.C used are the surface temperature and heat flow at the base of the model The governing heat conduction equation with an exponential heat source term $$\frac{d}{dz}\{(\overline{K}+K'(z))\frac{dT}{dz}\}=-A_0e^{-z/D} \quad (23)$$

with constant surface temperature and constant basal heat flow as boundary conditions (Type (ii))

Solution

Mean Temperature $$\overline{T}=E(T(z))=T_0+\frac{Q_B}{\overline{K}}z+\frac{A_0D^2}{\overline{K}}\left(1-\frac{z}{D}e^{-L/D}-e^{-z/D}\right) \quad (24)$$

Variance in the Temperature $$\sigma_T^2=c1\times Term1+c2\times Term2+c3\times Term3+c4\times Term4 \quad (25)$$

where the constants are $$c1=C_K^2A_0^2(1-\rho D)^2/\overline{K}^2$$

$$c2=C_K^2A_0\rho(\rho D-1)(Q_B-A_0De^{-L/D})/\overline{K}^2$$

$$c3=c2$$

$$c4=C_K^2\rho^2(Q_B-A_0De^{-L/D})^2/\overline{K}^2$$

The terms Term1, Term2, Term3, Term4 are same as given in condition 5.

The present invention has its novelty over previous work in the following counts
1. The method uses randomness in the thermal conductivity structure to quantify the errors in the subsurface temperature depth distribution
2. The method used has led to exact closed form solution to the mean and its variance on the subsurface temperature field for different prescribed boundary conditions.
3. The present solutions will be used extensively for quantifying the subsurface temperatures for any given region. The exact formulae for mean and variance in the subsurface temperature depth distribution have not been given so far and have a wide application in geothermal studies.

The following examples are given by way of illustrations and therefore should not be constructed to limit the scope of the present invention.

EXAMPLE 1

Numerical values of the controlling input thermal parameters for a Realistic Earth model for condition 1

| Boundary conditions: | |
|---|---|
| Surface Temperature ($T_0$) | 0 (° C.) |
| Surface heat flow ($Q_s$) | 80 (mW/m$^2$) |
| Model Depth (L). | 3.5 (km) |
| Random thermal conductivity: | |
| Mean thermal conductivity $\overline{K}$ | 3.0 (mW/m$^2$) |
| Coefficient of variability $C_k$ | 0.4 |
| Correlation length scale $1/\rho$ | 1 km |

Using these controlling thermal parameters the mean temperature and its error bounds have been computed using equations (9) and (10) and the results have been plotted in FIG. 1. From the figures we see that the error bounds on the temperature increases with depth, increases with an increase in the coefficient of variability in thermal conductivity and in the correlation length scale

EXAMPLE 2

Numerical values of the controlling input thermal parameters for a Realistic Earth model for condition 2

| Boundary conditions: | |
|---|---|
| Surface Temperature ($T_0$) | 0 (° C.) |
| Basal heat flow ($Q_B$) | 30 (mW/m$^2$) |
| Model Depth (L). | 5.5 (km) |
| Random thermal conductivity: | |
| Mean thermal conductivity $\overline{K}$ | 2.0 (mW/m$^2$) |
| Coefficient of variability $C_k$ | 0.3 |
| Correlation length scale $1/\rho$ | 1 km |

Using these controlling thermal parameters the mean temperature and its error bounds have been computed using equations (12) and (13) and the results have been plotted in FIG. 2. From the figures we see that the error bounds on the temperature increases with depth, increases with an increase in the coefficient of variability in thermal conductivity and in the correlation length scale

EXAMPLE 3

Numerical values of the controlling input thermal parameters for a Realistic Earth model for condition 3

| Boundary conditions: | |
|---|---|
| Surface Temperature ($T_0$) | 30 (° C.) |
| Surface heat flow ($Q_s$) | 40 (mW/m$^2$) |
| Heat Source | |
| Radiogenic heat production (A) | 2.5 ($\mu$W/m$^3$) |
| Model Depth (L). | 10 (km) |
| Random thermal conductivity: | |
| Mean thermal conductivity $\overline{K}$ | 3.0 (mW/m$^2$) |
| Coefficient of variability $C_k$ | 0.2 |
| Correlation length scale $1/\rho$ | 3 km |

Using these controlling thermal parameters the mean temperature and its error bounds have been computed using equations (15) and (16) and the results have been plotted in FIG. 3. From the figures we see that the error bounds on the temperature increases with depth, increases with an increase in the coefficient of variability in thermal conductivity and in the correlation length scale.

EXAMPLE 4

Numerical values of the controlling input thermal parameters for a Realistic Earth model for condition 4

| Boundary conditions: | |
|---|---|
| Surface Temperature ($T_0$) | 30 (° C.) |
| Surface heat flow ($Q_B$) | 20 (mW/m$^2$) |
| Heat Source | |
| Radiogenic heat production (A) | 2.5 ($\mu$W/m$^3$) |
| Model Depth (L). | 10 (km) |
| Random thermal conductivity: | |
| Mean thermal conductivity $\bar{K}$ | 3. (mW/m$^2$) |
| Coefficient of variability $C_k$ | 0.5 |
| Correlation length scale □ | 4 km |

Using these controlling thermal parameters the mean temperature and its error bounds have been computed using equations (18) and (19) and the results have been plotted in FIG. 4. From the figures we see that the error bounds on the temperature increases with depth, increases with an increase in the coefficient of variability in thermal conductivity and in the correlation length scale.

EXAMPLE 5

Numerical values of the controlling input thermal parameters for a Realistic Earth model for condition 5

| Boundary conditions: | |
|---|---|
| Surface Temperature ($T_0$) | 30 (° C.) |
| Surface heat flow ($Q_s$) | 43 (mW/m$^2$) |
| Heat Source | |
| Radiogenic heat production (A) | 2.6 ($\mu$W/m$^3$) |
| Characteristic Depth (D) | 12 (km) |
| Model Depth (L). | 35 (km) |
| Random thermal conductivity: | |
| Mean thermal conductivity $\bar{K}$ | 3.0 (mW/m$^2$) |
| Coefficient of variability $C_k$ | 0.3 |
| Correlation length scale $1/\rho$ | 10 km |

Using these controlling thermal parameters the mean temperature and its error bounds have been computed using equations (21) and (22) and the results have been plotted in FIG. 5. From the figures we see that the error bounds on the temperature increases with depth, increases with an increase in the coefficient of variability in thermal conductivity and in the correlation length scale.

EXAMPLE 6

Numerical values of the controlling input thermal parameters for a Realistic Earth model for condition 6

| Boundary conditions: | |
|---|---|
| Surface Temperature ($T_0$) | 0 (° C.) |
| Surface heat flow ($Q_B$) | 20 (mW/m$^2$) |
| Heat Source | |
| Radiogenic heat production (A) | 2.2 ($\mu$W/m$^3$) |
| Characteristic Depth (D) | 10 (km) |
| Model Depth (L). | 35 (km) |
| Random thermal conductivity: | |
| Mean thermal conductivity $\bar{K}$ | 2.6 (mW/m$^2$) |
| Coefficient of variability $C_k$ | 0.2 |
| Correlation length scale $1/\rho$ | 11 km |

Using these controlling thermal parameters the mean temperature and its error bounds have been computed using equations (24) and (25) and the results have been plotted in FIG. 6. From the figures we see that the error bounds on the temperature increases with depth, increases with an increase in the coefficient of variability in thermal conductivity and in the correlation length scale.

THE MAIN ADVANTAGES OF THE INVENTION ARE

1. The advantage of this invention is that exact formulaes have been given to quantify the error bounds on the subsurface temperatures due to errors in the thermal conductivity for a conductive earth model.
2. The errors in the temperatures will help in a better evaluation of the crustal thermal structure.
3. This study can be used in quantifying the conductive thermal structure along with its error bounds for any given region and thereby help in understanding the geodynamics of the region.
4. The exact formulae for the mean temperature and its standard deviation can be used in a better evaluation of the thermal state of oil bearing regions. These exact solutions can be used in tectonic studies and in studies related to crystallization of minerals.

REFERENCES

Gallagher, K., Ramsdale, M., Lonergan. L., and Marrow, D., 1997, The role thermal conductivities measurements in modeling the thermal histories in sedimentary basins, Mar. Petrol. Geol., 14, 201–214.

Jokinen. J. and Kukkonen. I. T., 1999a, Random modeling of lithospheric thermal regime: Forward simulation applied in uncertainty analysis, Tectonophysics, 306, 277–292.

Jokinen. J. and Kukkonen. I. T., 1999b, Inverse simulation of lithospheric thermal regime using the Monte Carlo method, 306, 293–310.

Nielson, S. B., 1987, Steady state heat flow in a random medium and linear heat flow heat production relationship, Geophys. Res. Lett. 14, 318–321.

Royer J. J. and Danis, M., 1988, Steady state geothermal model of the crust and problems of boundary conditions: Application to a rift system, the southern Rhinegraben, Tectonophysics, 156, 239–255.

Serrano, S. E., 1995, Forecasting scale dependent dispersion from spills in heterogeneous aquifers, J. Hydrology, 169, 151–169.

Srivastava, K., and Singh, R. N., 1998, A model for temperature variation in sedimentary basins due to random radiogenic heat sources, Geophys. J. Int., 135, 727–730.

Srivastava, K. and Singh, R. N., 1999, A stochastic model to quantify the steady state crustal geotherms subject to uncertainty in thermal conductivity, Geophy. J. Int, 138, 895–899.

Vasseur, G., and Singh, R. N., 1986, Effect of random horizontal variation in radiogenic heat source distribution on its relationship with heat flow, J. Geophys. Res. 91, 10397–10404.

Vasseur G., Lucazeau. F. and Bayer, R., 1985, The problem of heat flow density determination from inaccurate data, Tectonophysics, 121, 23–34.

We claim:

1. A method for obtaining closed form expressions for subsurface temperature depth distribution along with its error bounds, the method comprising:

defining at least two different types of boundary conditions involving at least three different heat sources;

selecting computer inputs from said defined boundary conditions;

using said inputs in a computerized stochastic heat conduction equation incorporating random thermal conductivity to obtain a mean and variance in temperature fields for said input, said equation being:

$$\frac{d}{dz}\left\{(\overline{K} + K'(z))\frac{dT}{dz}\right\} = -A(z) \quad (1)$$

where

T is the temperature (° C.),

A(z) is the radiogenic heat source ($\mu W/m^3$),

K(z)=$\overline{K}$+K'(z) is the thermal conductivity (W/m° C.) which is expressed as a sum of a deterministic component $\overline{K}$ and a random component K'(z) is the random component with mean zero and a Gaussian colored noise correlation structure represented by $$E(K'(z))=0 \quad (2)$$

$$E(K'(z_1)K'(z_2))=\sigma_{\overline{K}}^2=\sigma_{\overline{K}}^2 e^{-\rho|z-z_1|} \quad (3)$$

where $\sigma_{\overline{K}}^2$ is the variance in thermal conductivity (W/m° C.)

$\rho$ is the correlation decay parameter $m^{-1}$ (or $1/\rho$ is the correlation length scale) and $z_1$ and $z_2$ are the depths (m); and outputting said mean and variance in temperature fields.

2. A method as claim 1 wherein one of said boundary condition represents the condition of heat sources and is selected from the group consisting of Zero (A(z)=0), Constant (A(z)=A) and exponentially decreasing with depth (A(z)=$A_0 e^{-z/D}$).

3. A method as claim 1 wherein the boundary conditions comprise constant surface temperature and constant surface heat flow.

4. A method as claim 1 wherein the boundary conditions comprise constant surface temperature and constant basal heat flow.

5. A method as claim 1 wherein a parameter used is that of radiogenic heat generation.

6. A method as claim 1 carried out electronically using a computing means and wherein appropriate numerical values are given for controlling thermal parameters directly in the boxes that appear on the screen of the computer means, thereby instantaneously computing and plotting the mean and error bounds on the temperature depth distribution.

7. A method as claim 1 wherein the subsurface is one of a group consisting of: an oil field, natural gas field, tectonically active area and a mineral resource area.

* * * * *